US010531075B1

(12) United States Patent
Dariush et al.

(10) Patent No.: US 10,531,075 B1
(45) Date of Patent: Jan. 7, 2020

(54) SYNCHRONIZATION CONTROLLER UNIT FOR SENSOR NODE

(71) Applicant: Honda Motor Co., Ltd., Tokyo (JP)

(72) Inventors: Behzad Dariush, San Ramon, CA (US); Yi-Ting Chen, Sunnyvale, CA (US); Goksel Dedeoglu, Plano, TX (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/143,702

(22) Filed: Sep. 27, 2018

(51) Int. Cl.
| | |
|---|---|
| H04N 13/296 | (2018.01) |
| H04N 5/232 | (2006.01) |
| B60R 1/00 | (2006.01) |
| H04N 5/247 | (2006.01) |
| G01S 17/02 | (2006.01) |
| G01S 17/89 | (2006.01) |
| H04L 12/40 | (2006.01) |
| H04N 13/254 | (2018.01) |
| H04N 13/00 | (2018.01) |

(52) U.S. Cl.
CPC ............. *H04N 13/296* (2018.05); *B60R 1/00* (2013.01); *G01S 17/023* (2013.01); *G01S 17/89* (2013.01); *H04L 12/40013* (2013.01); *H04N 5/23238* (2013.01); *H04N 5/232061* (2018.08); *H04N 5/247* (2013.01); *H04N 13/254* (2018.05); *B60R 2300/105* (2013.01); *H04N 2013/0096* (2013.01)

(58) Field of Classification Search
CPC .............. H04N 13/296; H04N 13/254; H04N 5/232061; H04N 5/23238; H04N 5/247; H04N 2013/0096; B60R 1/00; B60R 2300/105; G01S 17/023; G01S 17/89; H04L 12/40013
See application file for complete search history.

(56) References Cited

U.S. PATENT DOCUMENTS

| | | | |
|---|---|---|---|
| 9,007,197 | B2 | 4/2015 | Breed |
| 9,369,689 | B1 | 6/2016 | Tran et al. |
| 9,435,887 | B2 | 9/2016 | Kim et al. |
| 9,481,301 | B2 | 11/2016 | Schaffner |
| 2015/0331422 | A1 | 11/2015 | Hartung et al. |
| 2016/0061954 | A1 | 3/2016 | Walsh et al. |
| 2017/0023665 | A1 | 1/2017 | Guo |
| 2018/0329066 | A1* | 11/2018 | Pacala ................... G01S 17/023 |

(Continued)

OTHER PUBLICATIONS

Schneider, Sebastian, et al. "Fusing vision and lidar-synchronization, correction and occlusion reasoning." Intelligent Vehicles Symposium (IV), 2010 IEEE. IEEE, 2010.

(Continued)

*Primary Examiner* — John R Schnurr
(74) *Attorney, Agent, or Firm* — Rankin, Hill & Clark LLP

(57) ABSTRACT

A vehicular synchronization system includes an image sensor of a vehicle. The image sensor captures image data for an image sensor field of view. The vehicular synchronization system also includes a light sensor having a radial view. The light sensor captures light data from around the vehicle in a full rotation. The vehicular synchronization system includes a synchronization control unit having a data receiving module, a trigger time determination module, a timer module, and a sensor trigger module. The data receiving module receives a data packet from the light sensor. The trigger time determination module determines a trigger time when a desired light sensor orientation overlaps with the image sensor field of view. The timer module sets a timer to elapse at the trigger time. The sensor trigger module controls the image sensor to capture image data at the trigger time when the timer elapses.

19 Claims, 5 Drawing Sheets

(56) References Cited

U.S. PATENT DOCUMENTS

2019/0098233 A1\* 3/2019 Gassend .............. H04N 5/3532
2019/0120948 A1\* 4/2019 Yang ....................... G01S 17/87

OTHER PUBLICATIONS

Mrstik, Paul, and Kresimir Kusevic. "Real time 3D fusion of imagery and mobile lidar." ASPRS 2009 Annual Conference. 2009.
Sairam, Nivedita, Sudhagar Nagarajan, and Scott Omitz. "Development of mobile mapping system for 3d road asset inventory." Sensors 16.3 (2016): 367.
Malik, Husnain, et al. "Fusion of in-vehicle sensor data to develop Intelligent Driver Training System (IDTS)." (2009).

\* cited by examiner

SYNCHRONIZATION CONTROLLER UNIT FOR SENSOR NODE

BACKGROUND

Increasingly, vehicles are integrating real time sensor data from multiple sensors with operational control of the vehicle. The sensor data takes into account objects (e.g., roadways, obstacles, other vehicles) that may be faced by the vehicle during vehicle operation in real-time. However, the disparate sensors act independently and therefore, produce uncorrelated data streams. For example, a first sensor and a second sensor may have different timing mechanisms that do not account for inherent latencies or delays. Accordingly, the data streams from the first sensor and the second sensor cannot be chronologically synched. Consequently, despite having a number of sensors, it might not be possible to determine a complete driving scene. This limits how well the sensor data is integrated with control systems of the vehicle.

BRIEF DESCRIPTION

According to one aspect, a vehicular synchronization system includes an image sensor of a vehicle. The image sensor captures image data for an image sensor field of view. The vehicular synchronization system also includes a light sensor having a radial view. The light sensor captures light data from around the vehicle in a full rotation of the light sensor. The vehicular synchronization system further includes a synchronization control unit having a data receiving module, a trigger time determination module, a timer module, and a sensor trigger module. The data receiving module receives a data packet from the light sensor. The data packet identifies a current orientation of the light sensor. The trigger time determination module determines a trigger time when a desired light sensor orientation overlaps with the image sensor field of view based on the current orientation of the light sensor. The timer module sets a timer to elapse at the trigger time. The sensor trigger module controls the image sensor to capture image data at the trigger time when the timer elapses.

According to another aspect, a computer-implemented method for synchronizing sensor nodes is described. The computer-implemented method includes receiving a data packet from a light sensor having a radial view. The light sensor captures light data from around a vehicle in a full rotation. The data packet identifies a current orientation of the light sensor. The computer-implemented method also includes determining a trigger time when a desired light sensor orientation overlaps with an image sensor field of view of an image sensor based on the current orientation of the light sensor. The computer-implemented method further includes setting a timer to elapse at the trigger time. The computer-implemented method includes controlling the image sensor to capture image data at the trigger time. The computer-implemented method further includes updating the timer for an upcoming trigger time when a next desired light sensor orientation overlaps with the image sensor field of view.

According to another aspect, a vehicular synchronization system includes an image sensor. The image sensor captures image data in an image sensor field of view. The vehicular synchronization system also includes a light sensor having a radial view. The light sensor captures light data from around the vehicle in a full rotation. The vehicular synchronization system further includes a synchronization control unit having a data receiving module, a trigger time determination module, a timer module, and a sensor trigger module. The data receiving module receives a data packet from the light sensor. The data packet identifies a current orientation of the light sensor. The trigger time determination module determines a trigger time when a desired light sensor orientation overlaps with the image sensor field of view based on the current orientation of the light sensor. The timer module sets a timer to elapse at the trigger time. The sensor trigger module controls the image sensor to capture image data at the trigger time when the timer elapses. The vehicular synchronization system further includes a robot operating system having a light sensor node and at least one image sensor node. The light sensor node receives the captured light data. The at least one image sensor node receives the captured image data. Synchronized sensor data is generated by combining the captured image data with the captured light data based on the trigger time.

DETAILED DESCRIPTION

Figure 1:
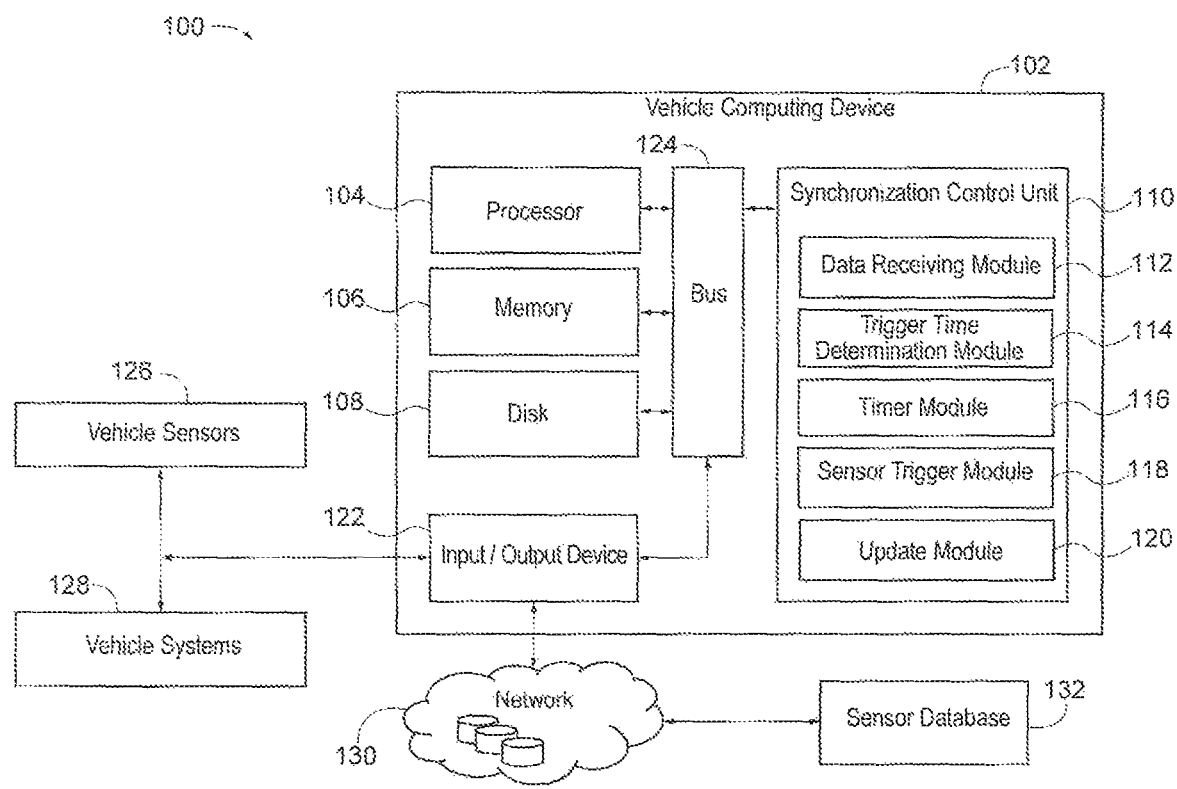
FIG. 1 is a schematic view of an exemplary operating environment for implementing systems and methods for synchronizing sensors with a synchronization controller unit according to an exemplary embodiment.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more vehicle occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more vehicle occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more vehicle occupants. Further, the term "vehicle" can include vehicles that are automated or non-automated with pre-determined paths or free-moving vehicles.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, among others.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

Referring now to the drawings, the showings are for purposes of illustrating one or more exemplary embodiments and not for purposes of limiting same. FIG. 1 is a schematic view of an exemplary operating environment 100 for implementing systems and methods for synchronizing sensors with a synchronization controller unit according to an exemplary embodiment. The components of the operating environment 100, as well as the components of other systems, hardware architectures, and software architectures discussed herein, can be combined, omitted, or organized into different architectures for various embodiments.

In the illustrated embodiment of FIG. 1, the operating environment 100 includes a vehicle computing device (VCD) 102 with provisions for processing, communicating, and interacting with various components of a vehicle and other components of the operating environment 100. In one embodiment, the VCD 102 can be implemented with a host vehicle 202 (FIG. 2), for example, as part of a telematics unit, a head unit, a navigation unit, an infotainment unit, an electronic control unit, among others. In other embodiments, the components and functions of the VCD 102 can be implemented remotely from the host vehicle 202, for example, with a portable device (not shown) or another device connected via a network (e.g., a network 130).

Generally, the VCD 102 includes a processor 104, a memory 106, a disk 108, and a synchronization control unit 110, and an input/output (I/O) interface 122, which are each operably connected for computer communication via a bus 124 and/or other wired and wireless technologies. The I/O interface 122 provides software and hardware to facilitate data input and output between the components of the VCD 102 and other components, networks, and data sources, which will be described herein. The synchronization control unit 110 includes a data receiving module 112, a trigger time determination module 114, a timer module 116, a sensor trigger module 118, and an update module 120, each suitable for controlling vehicle sensors 126 and vehicle systems 128 of the host vehicle 202.

The synchronization control unit 110 may be configured to operably control a plurality of components of the host vehicle 202. The synchronization control unit 110 may additionally provide one or more commands to one or more control units (not shown) of the host vehicle 202, including, but not limited to a sensor control unit, an engine control unit, a braking control unit, a transmission control unit, a steering control unit, and the like to control the host vehicle 202 to trigger sensors, brake, be autonomously driven, etc. In one or more embodiments, the synchronization control unit 110 may include a microprocessor, one or more application-specific integrated circuit(s) (ASIC), or other similar devices. The synchronization control unit 110 may also communicate with the memory 106 to execute the one or more applications, operating systems, vehicle systems 128, subsystems thereof, user interfaces, and the like.

The VCD 102 is operably connected for computer communication (e.g., via the I/O interface 122 and/or the bus 124) to one or more of the vehicle sensors 126. The vehicle sensors 126 may be associated with vehicle systems 128 and other vehicle sensors associated with the host vehicle 202. For example, the vehicle sensors 126 can include, but are not limited to, image sensors, such as cameras, optical sensors, radio sensors, etc. mounted to the interior or exterior of the host vehicle 202 and light sensors, such as light detection and ranging (LiDAR) sensors, radar, laser sensors etc. mounted to the exterior of the host vehicle 202. The vehicle sensors 126 associated with the vehicle systems 128 may include vehicle speed sensors, accelerator pedal sensors, brake sensors, throttle position sensors, wheel sensors, anti-lock brake sensors, camshaft sensors, among others. Other vehicle sensors can include, but are not limited to, sensors external to the vehicle (accessed, for example, via the network 130), for example, external cameras, radar and laser sensors on other vehicles in a vehicle-to-vehicle network, street cameras, surveillance cameras, among others.

The vehicle sensors 126 are operable to capture data regarding the vehicle, the vehicle environment, and/or the vehicle systems 128. The captured data may take the form of a generated data signal indicating a value corresponding to measured data. These data signals can be converted into other data formats (e.g., numerical) and/or used by the vehicle systems 128 and/or the VCD 102 to generate other data metrics, levels, and values.

Figure 3:
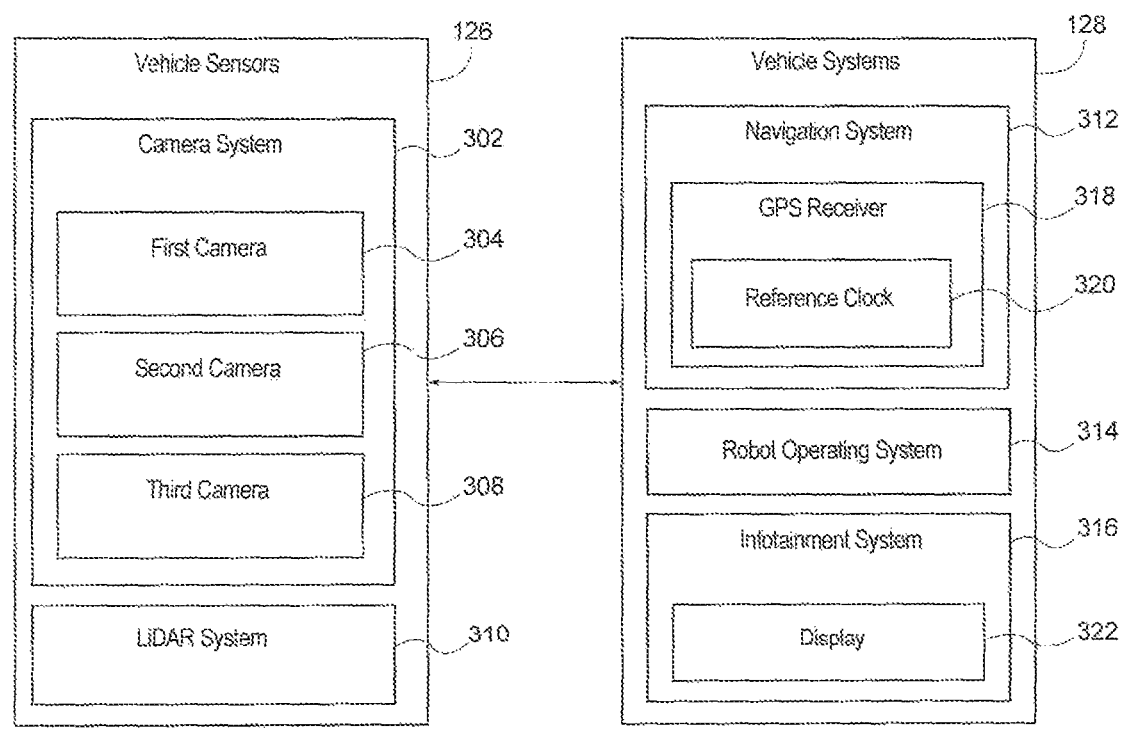
FIG. 3 is a schematic diagram of exemplary vehicle sensors and vehicle systems according to an exemplary embodiment.

FIG. 3 illustrates example vehicle sensors 126 that may be mounted to the host vehicle 202 according to an exemplary embodiment. It is understood that the vehicle sensors 126 shown in FIG. 3 are exemplary in nature and other vehicle sensors can be implemented with the systems and methods discussed herein. In the embodiment shown in FIG. 3, the vehicle sensors 126 include camera system 302. The camera system 302 may be comprised of one or more image sensors 208. In the embodiment shown in FIG. 3, one or more image sensors 208 of the camera system 302 includes a first camera 304, a second camera 306, and a third camera 308. More or fewer image sensors may be used and/or different types of image sensors may be used. The one or more image sensors 208 may be mounted at different points around the exterior of the host vehicle 202.

Figure 2:
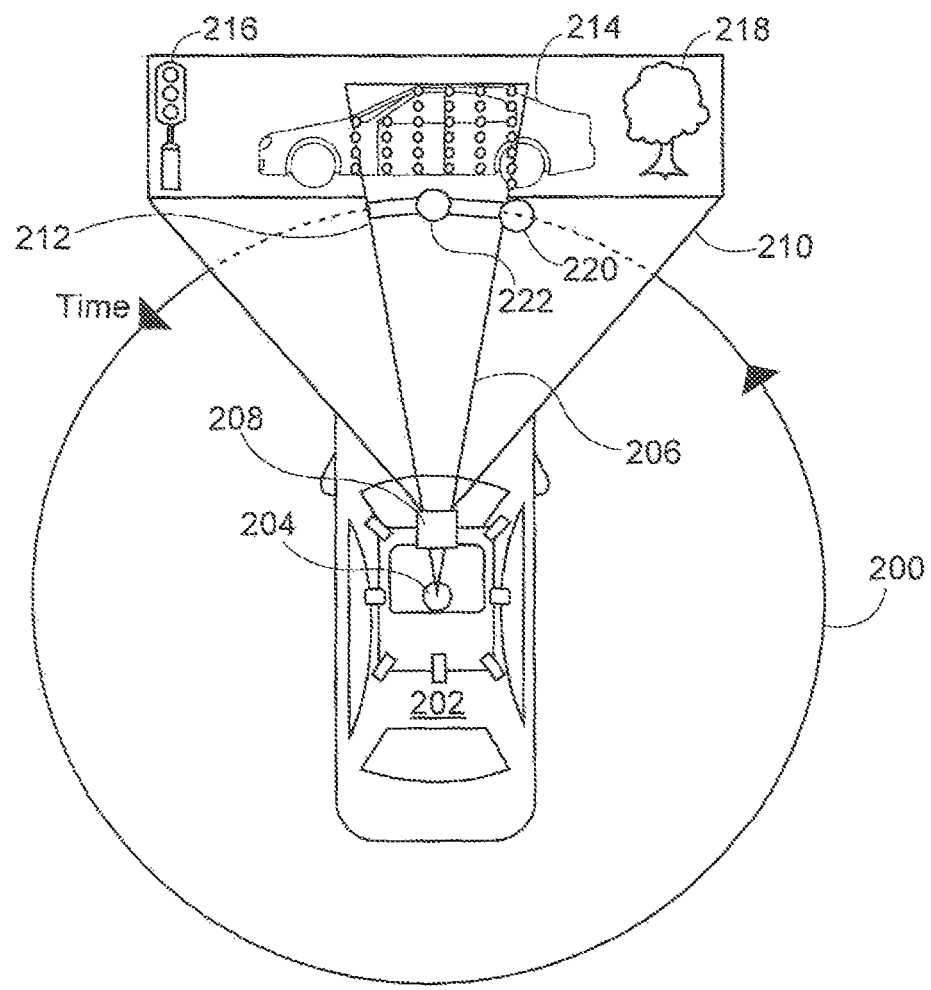
FIG. 2 is an illustrated example of the view of a plurality of sensors mounted to a vehicle according to an exemplary embodiment.

With regard to FIG. 2, the one or more image sensors 208 may be positioned in a direction to capture the surrounding environment of the host vehicle 202. In an exemplary embodiment, the surrounding environment of the host vehicle 202 may be defined as a predetermined area located around (front/sides/behind) the host vehicle 202 (e.g., road environment in front, sides, and/or behind of the host vehicle 202) that may be included within the vehicle's travel path. The one or more image sensors 208 may be disposed at external front and/or side portions of the host vehicle 202, including, but not limited to different portions of the vehicle bumper, vehicle front lighting units, vehicle fenders, and the windshield. The one or more image sensors 208 may be positioned on a planar sweep pedestal (not shown) that allows the one or more image sensors 208 to be oscillated to capture images of the external environment of the host vehicle 202 at various angles. Additionally, the one or more image sensors 208 may be disposed at internal portions of the host vehicle 202 including the vehicle dashboard (e.g., dash mounted camera), rear side of a vehicle rear view mirror, etc.

Returning to FIG. 3, the one or more image sensors 208 may include the first camera 304, the second camera 306, and the third camera 308 of the camera system 302 being placed at different points around the host vehicle 202 to image different fields of view. In another embodiment, the first camera 304, the second camera 306, and the third camera 308 may have at least partially overlapping fields of view to achieve a stereoscopic image that creates the impression of depth and solidarity, for example, to enable a three-dimensional effect. While three cameras are described, more or fewer cameras may be used by the camera system 302.

The vehicle sensors 126 may also include a LiDAR system 310. The LiDAR system 310 may comprise one or more light sensing transceivers 204 that include one or more planar sweep lasers that include respective three-dimensional LiDAR sensors that may be configured to oscillate or rotate. The one or more light sensing transceivers 204 emit one or more laser beams of ultraviolet, visible, or near infrared light toward the surrounding environment of the host vehicle 202. The one or more light sensing transceivers 204 may be configured to receive one or more reflected laser waves (e.g., signals) that are reflected off one or more objects included within the surrounding environment of the host vehicle 202. In other words, upon transmitting the one or more laser beams to the surrounding environment of the host vehicle 202, the one or more laser beams may be reflected as laser waves by one or more traffic related objects (e.g., motor vehicles, pedestrians, trees, guardrails, etc.) that are located within the surrounding environment of the host vehicle 202 and is received back at the one or more light sensing transceivers 204.

The vehicle systems 128 include and/or are operably connected for computer communication to various vehicle sensors 126. The vehicle sensors 126 provide and/or sense information associated with the host vehicle 202, the vehicle environment, and/or the vehicle systems 128. The vehicle systems 128 can include, but are not limited to, any automatic or manual systems that can be used to enhance the vehicle, driving, and/or safety. In the embodiment shown in FIG. 3, the vehicle systems 128 can include a navigation system 312, a robot operating system 314, and an infotainment system 316.

The navigation system 312 may be primarily used to identify a location of the host vehicle 202 and calculate directions to a destination. The navigation system 312 includes a global positioning system (GPS) receiver 318 to determine geolocation and time information. In addition to using this information to identify locations and calculate directions, the geolocation and time information may be used by other vehicle systems 128 and the vehicle sensors 126. The time information may be based on a time stamp signal from a reference clock 320 of the GPS receiver 318. The reference clock 320 outputs the time stamp signal and repeats the time stamp signal at a known interval. For example, the reference clock 320 may output a time stamp signal having a width of less than one second and a sharply rising or abruptly falling edge that accurately repeats once per second.

The robot operating system 314 acts as a data platform for the vehicle systems 128. In particular, the robot operating system 314 manages nodes that communicate between the different components of the operating environment 100. For example, the vehicle sensors 126 may have corresponding sensor nodes in the robot operating system 314 that receive and transmit sensor data from the vehicle sensors 126, as will be described in more detail with respect to FIG. 4. Likewise, the synchronization control unit 110 may have synchronization control nodes that receive and transmit data from the synchronization control unit 110, which will also be described in more detail with respect to FIG. 4. The robot operating system 314 may be the Robot Operating System that is the subject of an open source project created by Willow Garage and Stanford Artificial Intelligence (AI) Laboratory or another data platform having one or a set of utilities that receive, manage, create, and/or send nodes may be used for the robot operating system 314. The nodes may be components or programs associated with the vehicle sensors 126 and/or vehicle systems 128. The nodes send and receive messages regarding the associated vehicle sensors 126 and/or vehicle systems 128 in the operating environment 100, as will be discussed in more detail below.

Further, the vehicle systems 128 can include an infotainment system 316. The infotainment system 316 may include an in-vehicle display 322. As will be discussed in more detail herein, the synchronization control unit 110 causes the synchronization at least two of the vehicle sensors 126 using the robot operating system 314. The synchronized sensor data from the synchronized vehicle sensors may be displayed on the in-vehicle display 322. The infotainment system 316 may additionally cue a vehicle occupant that the synchronized sensor data is available through an audio or visual alerts.

Returning to FIG. 1, the VCD 102 is also operatively connected for computer communication to the network 130 and a sensor database 132. It is understood that the connection from the I/O interface 122 to the network 130 and the sensor database 132 can be facilitated in various ways. For example, through a network connection (e.g., wired or wireless), a cellular data network from a portable device (not shown) or a vehicle to vehicle ad-hoc network (not shown), an in-vehicle network (not shown), among others, or any combination of thereof.

The network 130 is, for example, a data network, the Internet, a wide area network or a local area network. The network 130 serves as a communication medium to various remote devices (e.g., databases, web servers, remote servers, application servers, intermediary servers, client machines, other portable devices). It is understood that in some embodiments, the sensor database 132 can be included in the network 130, accessed by the VCD 102 through the network 130, and/or the network 130 can access the sensor database 132. Thus, in some embodiments, the VCD 102 can obtain data from the sensor database 132 via the network 130.

The sensor database 132 can include sensor information from external sensors, such as traffic cameras, in-road sensors, and the sensors of proximal vehicles to the host vehicle 202, such as cameras. The sensor database 132 may identify objects in the area of the host vehicle 202 in real-time using the external sensors. The sensor database 132 may include historical information about permanent and semi-permanent objects such as geological objects (e.g., bodies of water, landforms, perennial plants, etc.), man-made objects (e.g., bridges, traffic signals, buildings, etc.), and transitory objects (e.g., people in a crosswalk, dogs chasing cars, proximal vehicle, etc.). In some embodiments, the sensor database 132 can be updated with object information on a continual or periodic basis. The sensor database 132 can aggregate data from the VCD 102, the vehicle sensors 126, and the vehicle systems 128.

It is understood that the sensor database 132 can be located remotely from the VCD 102 and accessed, for example, by the network 130. In some embodiments, the sensor database 132 could be located on-board the host vehicle 202, at for example, the memory 106 and/or the disk 108. Further, in some embodiments, the sensor database 132 could be located on an external memory or a disk (not shown) integrated. In other embodiments, the sensor database 132 could be distributed in one or more locations.

The system shown in FIG. 1 will now be described in operation according to an exemplary embodiment over a time 200, shown in FIG. 2. As discussed above, and as shown in detail in FIG. 2, the system includes a host vehicle 202 having one or more light sensing transceivers 204. The one or more light sensing transceivers 204 are sensitive to electromagnetic radiation in radial view 206. A light sensing transceivers 204 rotates about its central axis. Accordingly, the one or more light sensing transceivers 204 can capture data from 360 degrees around the host vehicle 202 in time 200. In this manner, the one or more light sensing transceivers 204 may be continuously sensitive to electromagnetic radiation for a rotating radial view 206.

The one or more image sensors 208 have at least one field of view corresponding to a field of view 210. The one or more image sensors 208 capture data from the environment of the host vehicle 202 as one or more images. For example, as described above, the image sensors may be cameras that capture image frames. The one or more image sensors 208 may have a stationary field of view 210 or alternatively the field of view 210 may pan at least partially around the host vehicle 202. In some embodiments, the field of view 210 may be discretized over areas corresponding to the one or more image sensors 208 either individually or in combination. For example, each camera may have a corresponding field of view or multiple cameras may have a combined field of view.

As the one or more light sensing transceivers 204 rotate in time 200, the radial view 206 may periodically overlap with the field of view 210 in a synchronization area 212. The synchronization area 212 is defined by the overlap of at least a portion of the radial view with at least a portion of the field of view 210. The synchronization area 212 may be bounded by either a region of the radial view 206 or the field of view 210. Alternatively, the radial view 206 and the field of view 210 may be aligned on at least one side, such that the at least one side bounds the synchronization area 212 from an un-sensed region of the environment of the host vehicle 202.

Objects, such as, at least a portion of a proximal vehicle 214 may be in the synchronization area 212. Other objects may be sensed by one sensor but not another. For example, the street light 216 and/or a tree 218 may be in the field of view 210 of the one or more image sensors 208 but not in the synchronization area 212. Instead, the street light 216 may be the synchronization area 212 at a later point in time 200. Likewise, the tree 218 may have been in the synchronization area 212 at a previous point in time 200.

The host vehicle 202 includes the synchronization control unit 110, described above with respect to FIG. 1, which synchronizes the one or more light sensing transceivers 204 and the one or more image sensors 208. The data receiving module 112 receives data from a number of sources. For example, the data receiving module 112 may receive a time-based schedule for triggering the one or more image sensors 208. In another embodiment, the data receiving module 112 may receive an orientation-based schedule for triggering the one or more image sensors 208, based on a desired orientation of the one or more light sensing transceivers 204. Additionally, the synchronization control unit 110 may receive a data packet from the one or more light sensing transceivers 204. The data packet may include a current orientation of the one or more light sensing transceivers 204.

In some embodiments, the data packet includes a light sensor time stamp. The light sensor time stamp may be based on a timing reference signal from a reference clock 320. The reference clock 320 may be a component integrated with the GPS receiver 318 of the navigation system 312. In another embodiment, a timing reference signal may integrated with the one or more light sensing transceivers 204. In some embodiments, the timing reference signal is based on a standardized on time. For example, the timing reference signals may be based on a global positioning system (GPS).

The trigger time determination module 114 determines a trigger time 220 when the radial view 206 of the one or more light sensing transceivers 204 coincides with a desired light sensor orientation. At the desired light sensor orientation, the radial view 206 overlaps with the field of view 210 creating the synchronization area 212. In some embodiments, the trigger time determination module 114 may determine the trigger time 220 based on the time-based schedule or the orientation-based schedule. In another embodiment, the trigger time determination module 114 may calculate the trigger time 220 based on information from the data packet such as the current orientation of the one or more light sensing transceivers 204 and a light sensor time stamp. For example, based on a time stamp, orientation, and rate of rotation, an estimated time of when to trigger a camera may be calculated.

The timer module 116 sets a timer to elapse at the trigger time 220. When the timer elapses, the sensor trigger module 118 controls at least one image sensor of the one or more image sensors 208 to activate such that the at least one image sensor captures image data in the synchronization area 212. Suppose that the rotation of the one or more light sensing transceivers 204 is counter clockwise in time 200. In some embodiments, the trigger time 220 may be set to incorporate latencies so that the one or more image sensors 208 activate at an activation time 222.

The radial view 206 has a radial longitudinal axis, such that the radial view 206 is symmetrical about the radial longitudinal axis. The field of view 210 has a camera central axis, such that the field of view 210 is symmetrical about the camera longitudinal axis. In some embodiments, the activation time 222 may be when the one or more light sensing transceivers 204 is orientated such that the radial longitudinal axis overlaps with the camera central axis.

The update module 120 updates the timer for an upcoming trigger time when a next desired light sensor orientation of the one or more light sensing transceivers 204 overlaps with the image sensor field of view. The upcoming trigger time may be based on the time-based schedule or the orientation-based schedule. In another embodiment, the trigger time determination module 114 may calculate the next trigger time based on the time-based schedule, the orientation-based schedule, and/or information from a data packet of the one or more light sensing transceivers 204. The data packet may be a previous data packet or an updated data packet from the one or more light sensing transceivers 204.

Figure 4:
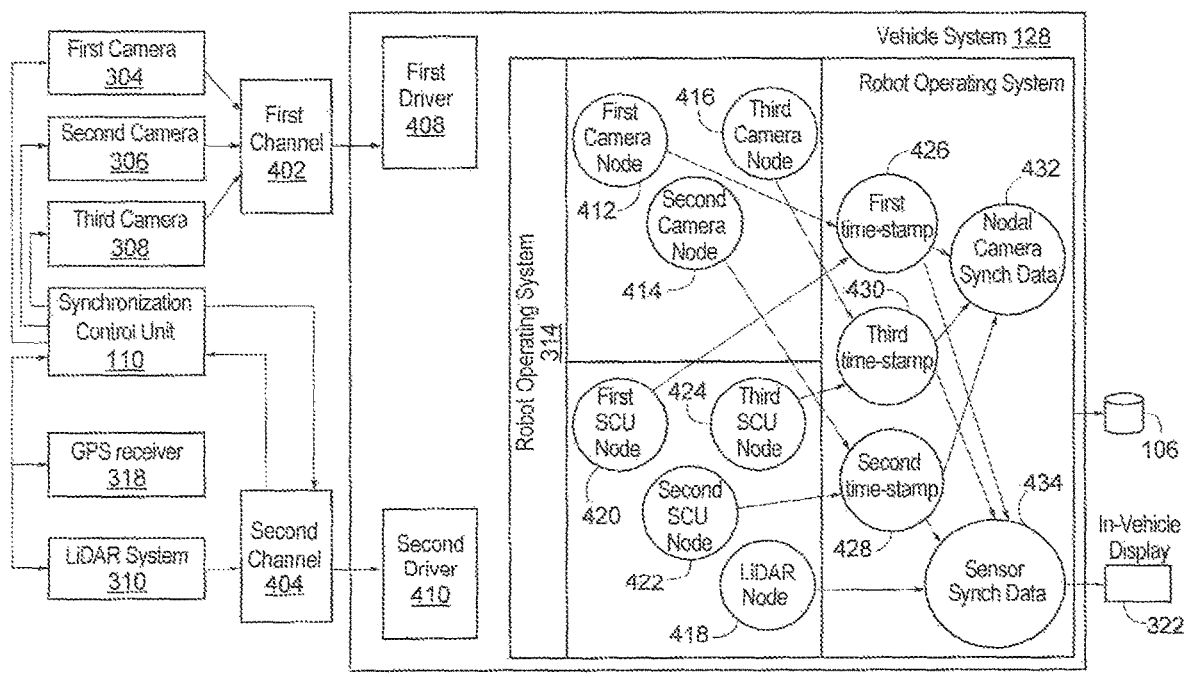
FIG. 4 is a schematic diagram of a vehicle implementing a system for synchronizing sensors nodes with a synchronization controller unit according to an exemplary embodiment.

In some embodiments, the synchronization control unit 110 utilizes the robot operating system 314 to synchronize the one or more light sensing transceivers 204 and the one or more image sensors 208. FIG. 4 is a schematic diagram of a vehicle implementing a system for synchronizing the sensors with sensor nodes according to an exemplary embodiment. For example, the first camera 304, the second camera 306, and the third camera 308 may communicate through a first channel 402 and the LiDAR system 310 may communicate through a second channel 404. Although illustrated as different channels, the first channel 402 and the second channel 404 may be the same channel. In another embodiment, the first channel may be a hub device and the second channel 404 may be an ethernet switch. In another embodiment, the sensor data may be from the sensor database 132 and the channel may be the network 130.

The first camera 304, the second camera 306, and the third camera 308 may communicate through the first channel 402 according to a first driver 408. The LiDAR system 310 may communicate through the second channel 404 according to a second driver 410. The robot operating system 314 may operate subject to or as a part of a vehicle system 128 or operate in conjunction with the processor 104.

The robot operating system 314 has sensor nodes corresponding to the sensors. For example, the first camera 304, the second camera 306, and the third camera 308 correspond to a first camera node 412, a second camera node 414, and a third camera node 416, respectively. Likewise, the LiDAR system 310 corresponds to a LiDAR node 418. The sensor nodes are capable of sending and receiving messages with other components of the operating environment 100 including the vehicle sensors 126 and the vehicle systems 128. For example, the first camera node may receive image data, such as image frames captured by the one or more image sensors 208.

The robot operating system 314 also includes synchronization control nodes. The synchronization control nodes correspond to sensor nodes for sensors that do not have access to a timing reference signal. In this example, suppose that the first camera 304, the second camera 306, and the third camera 308 do not have access to a timing reference signal that issues a time stamp based on a standardized time. Accordingly, the first camera node 412, the second camera node 414, and the third camera node 416 correspond a first synchronization control node 420, a second synchronization control node 422, and a third synchronization control node 424, respectively. The synchronization control nodes are capable of sending and receiving messages from the synchronization control unit 110 with other components of the operating environment 100 including other nodes, the vehicle sensors 126, and/or the vehicle systems 128. In one embodiment, the synchronization control nodes include trigger time data, such as trigger time 220 and/or activation time 222 determined by the trigger time determination module 114 of the synchronization control unit 110.

The sensor nodes and the synchronization control nodes communicate with time stamp nodes. The time stamp nodes correlate sensor data of the sensor nodes with the trigger time data of the synchronization control nodes. For example, the first time stamp node 426 correlates image data from the first camera node 412 with trigger time data from the first synchronization control node 420. Accordingly, the first time stamp node 426 can time stamp the image data based on when the first camera 304 was triggered by the synchronization control unit 110. By correlating the first camera node 412 with the first synchronization control node 420, the first time stamp node 426 avoids latency issues with receiving the image data. For example, if it takes the first camera 304 one second to capture and deliver image data, a one second delay is incurred by the robot operating system 314.

Suppose that the LiDAR system 310 operates using the reference clock 320 of the navigation system 312 or has an internal reference clock. Light data received from the LiDAR system 310 may not be subject to the one second delay. Accordingly, when attempting to associate with the image data with the light data the light data would be from one second earlier than the image data. In this example, the light data from the one or more light sensing transceivers 204 would illustrate the proximal vehicle 214 but the image data of the one or more image sensors 208 would illustrate the street light 216. Accordingly, the first time stamp node 426, the second time stamp node 428, and the third time stamp node 430 correlate the image data with the trigger time data. Thereby, avoiding propagating delay errors inherent in processing the sensor data.

The correlated data is received by the nodal camera synch data 432. The nodal camera synch data 432 may use the data from the first time stamp node 426, the second time stamp node 428, and the third time stamp node 430 to create a stereoscopic image based on the image data of the first camera 304, the second camera 306, and the third camera 308 being triggered at the trigger time. The nodal camera synch data 432 can be stored in the memory 106 or displayed on the in-vehicle display 322.

The correlated data from the first time stamp node 426, the second time stamp node 428, and the third time stamp node 430 can also be combined with the light data of the LiDAR node 418 to generate synched sensor data 434. The synched sensor data 434 can be stored in the memory 106 or displayed on the in-vehicle display 322. Alternatively, the vehicle systems 128 may use the synched sensor data 434 for operational functionality, such as autonomous driving.

Figure 5:
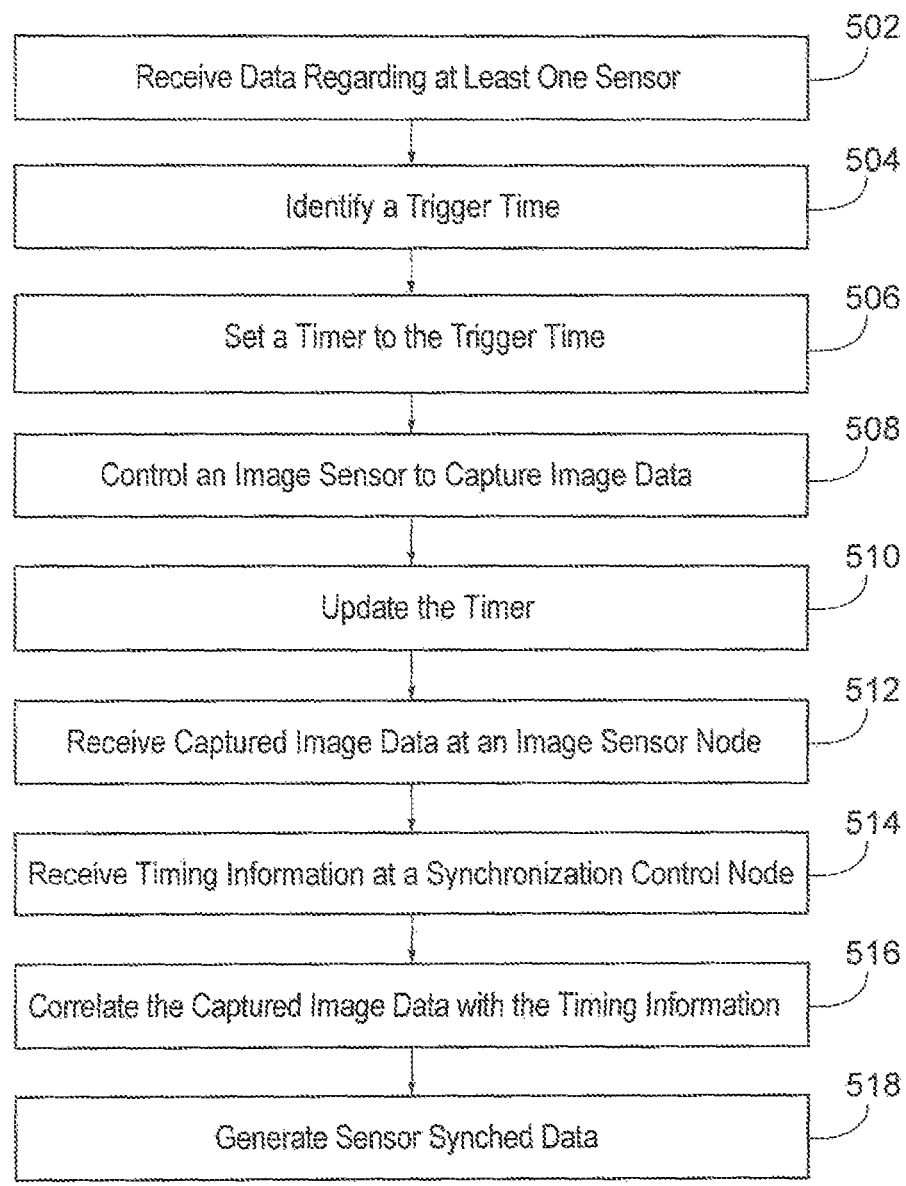
FIG. 5 is a process flow diagram of a method for synchronizing sensors with a synchronization controller unit according to an exemplary embodiment.

FIG. 5 is a process flow diagram of a method for synchronizing sensors with a synchronization controller unit according to an exemplary embodiment. FIG. 5 will be described with reference to FIGS. 1, 2, and 4. It is understood that the illustrative examples discussed herein are exemplary in nature and that other vehicle sensors 126, vehicle systems 128, and vehicle control functions can be implemented.

At block 502, the method includes receiving a data packet from a light sensor having a radial view. The light sensor may be a light sensor transceiver of the one or more light sensing transceivers 204 such a rotating LiDAR sensor of a LiDAR system 310. The light sensor is configured to capture light data from around a vehicle. For example, the light sensor may rotate 360 degrees around the host vehicle 202. The light sensor generates a data packet that identifies a current orientation of the light sensor. The data packet may also include a light sensor time stamp based on a timing reference signal. The timing reference signal may be generated by the light sensor itself or be received from a reference clock 320.

In some embodiments, the light sensor may periodically generate updated data packets. For example, the light sensor may generate a data packet according to a time interval (e.g., every 46 microseconds). Alternatively, the light sensor may generate a data packet according to an angular interval (e.g., every 5 degrees of the 360 degrees traversed by the light sensor).

At block 504, the method includes determining a trigger time when a desired light sensor orientation of the light sensor overlaps with an image sensor field of view of an image sensor. The trigger time may be based on the data packet and following updated data packets. The trigger time may be defined as the time when the radial view 206 first overlaps with the field of view 210 defining the boundary of the synchronization area 212.

At block 506, the method includes setting a timer to elapse at the trigger time. The timer may be a component of synchronization control unit 110 or as a part of the vehicle sensors 126 or the vehicle systems 128

At block 508, the method includes controlling the image sensor to capture image data at the trigger time. In another embodiment, the image sensor may be actuated at the trigger time but due to inherent latencies, capture image data at the activation time. However, the image sensor may not have access to a timing mechanism, and accordingly, the captured image data is not associated with a time stamp.

At block 510, the method includes updating the timer for an upcoming trigger time when a next desired light sensor orientation overlaps with the image sensor field of view. Accordingly, the synchronization control unit 110 prepares to capture updated image data at the upcoming trigger time. The upcoming trigger time may be based on the updated data packets of the light sensor.

At block 512, the method includes receiving the captured image data at the at least one image sensor node. The captured image data may include image data such as image frames from the image sensors.

At block 514, the method includes receiving timing information for the image sensors at a synchronization control node corresponding to the at least one image sensor node. The synchronization control node may receive timing information from the synchronization control unit 110. The timing information indicates the time at which the image sensor captured the image data. For example, the timing information may include trigger time 220. Alternatively, the synchronization control unit 110 may have received data at the data receiving module 112 regarding a latency of image sensor. Accordingly, the timing information may include the activation time 222 to take into account the latency of the image sensor.

At block 516, the method includes generating image synched data at a time stamp node by combining the captured image data with the timing information. The image synched data accurately indicates the time at which the image data was captured without incurring any delay in the image data being processed from the image sensor, through the first channel 402 according to the first driver 408 to the image sensor node.

At block 518, the method includes generating sensor synched data by combining the image synched data with light data. In some embodiments, the light data includes the light sensor time stamp. Accordingly, the image synched data is combined with the light data by correlating the timing information with the light sensor time stamp to ensure that the image synched data was captured at the same time that light data was captured. The timing of the image sensor and the light sensor is synchronized according to the trigger time, or in some embodiments the activation time, which is the time at which radial view 206 of the light sensor at least partially overlaps with the field of view 210 of the image sensor. Because the image data and the light data are synchronized, both capture data regarding the same objects. Accordingly, different types of sensors can provide a myriad of different data regarding the objects, such as the position, speed, shape, etc. of the objects. Thus, the sensor synched data can be used by vehicle systems to facilitate the vehicle operation, such as for autonomous driving.

The examples are described with respect to an image sensor and the light sensor. These are merely exemplary in nature and other sensors may be used. For example, the time stamp nodes may combine light data from a light sensor node with timing information regarding the light sensor rather than the image sensors as described. Furthermore, it is understood that the sensors can be any type of sensor, for example, acoustic, electric, environmental, optical, imaging, light, pressure, force, thermal, temperature, proximity, among others and operate in a similar manner as the image sensor or light sensor described. For example, image data may be synched with thermal sensor data to determine if objects in the image data are emitting heat and therefore, may be alive.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown. It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicular synchronization system, comprising:
an image sensor, of a vehicle, configured to capture image data for an image sensor field of view;
a light sensor having a radial view, wherein the light sensor is configured to capture light data from around the vehicle in a full rotation; and
a synchronization control unit having a processor, the processor configured to:
receive a data packet from the light sensor, wherein the data packet includes a light sensor time stamp from a reference clock, and wherein the data packet identifies a current orientation of the light sensor;
determine a trigger time when a desired light sensor orientation overlaps with the image sensor field of view based on the current orientation of the light sensor and the light sensor time stamp;
set a timer to elapse at the trigger time; and
control the image sensor to capture image data at the trigger time when the timer elapses.

2. The vehicular synchronization system of claim 1, wherein the processor is further configured to update the timer for an upcoming trigger time when a next desired light sensor orientation overlaps with the image sensor field of view.

3. The vehicular synchronization system of claim 1, wherein the reference clock is a component of a navigation system.

4. The vehicular synchronization system of claim 1, wherein the processor determines the trigger time based on the reference clock.

5. The vehicular synchronization system of claim 1, wherein the image sensor has an image sensor node associated with captured image data, wherein the synchronization control unit has a synchronization control node corresponding to the image sensor node, and wherein a time stamp node applies an image sensor time stamp to the captured image data based on the trigger time.

6. The vehicular synchronization system of claim 5, wherein the light sensor has a corresponding light sensor node associated with the captured light data and the data packet, and wherein the light data is synched with image data based on the image sensor time stamp and the data packet.

7. The vehicular synchronization system of claim 1, wherein the image sensor includes a first camera, a second camera, and a third camera, and wherein the first camera is associated with a first camera node, the second camera is associated with a second camera node, and the third camera is associated with a third camera node.

8. The vehicular synchronization system of claim 7, wherein the first camera is positioned left of the field of view, the second camera is centered on the field of view, and the third camera is positioned right of the field of view to create a stereoscopic view.

9. The vehicular synchronization system of claim 7, wherein a first time stamp node correlates the first camera node with a first synchronization control node, a second time stamp node correlates the second camera node with a second synchronization control node, and a third time stamp node correlates the third camera node with a third synchronization control node, and wherein the first time stamp node, the second time stamp node, and the third time stamp node collectively have image synched data.

10. The vehicular synchronization system of claim 9, wherein the light sensor is a light detection and ranging (LiDAR) sensor corresponding to, a LiDAR node associated with light data, and wherein the light data is synched with the image synched data to generate sensor synched data.

11. A computer-implemented method for synchronizing sensor nodes, comprising:

receiving a data packet from a light sensor having a radial view, wherein the light sensor is configured to capture light data from around a vehicle in a full rotation, and wherein the data packet identifies a current orientation of the light sensor and includes a light sensor time stamp;

determining a trigger time when a desired light sensor orientation overlaps with an image sensor field of view of an image sensor based on the current orientation of the light sensor and the light sensor time stamp;

setting a timer to elapse at the trigger time;

controlling the image sensor to capture image data at the trigger time; and updating the timer for an upcoming trigger time when a next desired light sensor orientation overlaps with the image sensor field of view.

12. The computer-implemented method of claim 11, further comprising:

applying at least one image sensor times amp to image data from the image sensor based on a reference clock.

13. The computer-implemented method of claim 12, wherein the reference clock in integrated with a vehicle navigation system.

14. The computer-implemented method of claim 11, wherein captured image data is associated with the trigger time to create image synched data, and wherein the image synched data is correlated with the captured light data from the light sensor to generate sensor synched data.

15. A vehicular synchronization system, comprising:

an image sensor of a vehicle, wherein the image sensor is configured to capture image data in an image sensor field of view;

a light sensor having a radial view, wherein the light sensor is configured to capture light data from around the vehicle in a full rotation;

a synchronization control unit having a processor, the processor configured to:

receive a data packet from the light sensor, wherein the data packet identifies a current orientation of the light sensor and includes a light sensor time stamp;

determine a trigger time when a desired light sensor orientation overlaps with the image sensor field of view based on the current orientation of the light sensor and the light sensor time stamp;

set a timer to elapse at the trigger time; and control the image sensor to capture image data at the trigger time when the timer elapses; and a robot operating system having a memory and a light sensor node configured to receive the captured light data and at least one image sensor node configured to receive the captured image data and generate synchronized sensor data by combining the captured image data with the captured light data based on the trigger time.

16. The vehicular synchronization system of claim 15, wherein the processor is further configured to update the timer for an upcoming trigger time when a next desired light sensor orientation overlaps with the image sensor field of view.

17. The vehicular synchronization system of claim 15, wherein the robot operating system further comprises a time stamp node configured to apply an image sensor time stamp to the captured image data based on the trigger time.

18. The vehicular synchronization system of claim 15, wherein the image sensor includes a first camera, a second camera, and a third camera, and wherein the at least one image sensor node includes a first camera node, a second camera node, and a third camera node.

19. The vehicular synchronization system of claim 18, wherein a first time stamp node correlates the first camera node with a first synchronization control node, a second time stamp node correlates the second camera node with a second synchronization control node, and a third time stamp node correlates the third camera node with a third synchronization control node, and wherein the first time stamp node, the second time stamp node, and the third time stamp node collectively have image synched data.

* * * * *